US010436416B2

(12) United States Patent
Salter et al.

(10) Patent No.: US 10,436,416 B2
(45) Date of Patent: Oct. 8, 2019

(54) VEHICLE LIGHT ASSEMBLY WITH HEAT SINK

(71) Applicant: Ford Global Technologies, LLC, Dearborn, MI (US)

(72) Inventors: Stuart C. Salter, White Lake, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/653,908

(22) Filed: Jul. 19, 2017

(65) Prior Publication Data

US 2019/0024869 A1    Jan. 24, 2019

(51) Int. Cl.
| | |
|---|---|
| *F21S 45/47* | (2018.01) |
| *B60Q 1/26* | (2006.01) |
| *F21S 43/14* | (2018.01) |
| *F21V 29/70* | (2015.01) |
| *F21S 45/49* | (2018.01) |
| *F21V 19/00* | (2006.01) |

(Continued)

(52) U.S. Cl.
CPC ............ *F21S 45/47* (2018.01); *B60Q 1/2603* (2013.01); *B60Q 1/2611* (2013.01); *B60Q 1/2615* (2013.01); *B60Q 1/2696* (2013.01); *F21S 43/14* (2018.01); *F21S 43/15* (2018.01); *F21S 45/49* (2018.01); *F21V 19/005* (2013.01); *F21V 29/70* (2015.01); *B60Q 1/28* (2013.01); *B60Q 1/30* (2013.01); *B60Q 1/302* (2013.01); *B60Q 1/32* (2013.01); *B60Q 2300/112* (2013.01); *B60Q 2300/314* (2013.01); *B60Q 2400/30* (2013.01); *F21S 45/48* (2018.01); *F21W 2107/10* (2018.01); *F21Y 2115/10* (2016.08)

(58) Field of Classification Search
CPC ..... B60Q 1/2696; B60Q 1/2615; F21S 41/10; F21S 41/141; F21S 41/25; F21S 45/00; F21S 45/40; F21S 45/47; F21S 43/14; F21S 45/48; F21S 43/15; F21S 45/49; F21V 15/01; F21V 15/012; F21V 29/70; F21V 29/503; F21V 29/504; F21V 29/505; F21W 2102/00; F21W 2107/10; H05B 37/02; H05B 37/029; H05B 33/089; F21Y 2115/10

See application file for complete search history.

(56) References Cited

U.S. PATENT DOCUMENTS

| | | | | |
|---|---|---|---|---|
| 2,086,524 A | * | 7/1937 | Clark ................... | B60Q 1/2611 362/493 |
| 3,728,537 A | * | 4/1973 | Barenyi ............... | B60Q 1/2611 296/210 |

(Continued)

FOREIGN PATENT DOCUMENTS

| | | |
|---|---|---|
| CN | 104869708 A | 8/2015 |
| DE | 102010064343 A1 | 7/2012 |

*Primary Examiner* — Zheng Song
(74) *Attorney, Agent, or Firm* — Vichit Chea; Price Heneveld LLP

(57) ABSTRACT

A vehicle light assembly is provided herein and includes a light source, an optic configured to output light emitted by the light source, and a thermal conductive member enclosing the light source and the optic. The thermal conductive member is thermally coupled to a vehicle body via a thermal transfer adhesive.

8 Claims, 4 Drawing Sheets

(51) Int. Cl.
*F21S 43/15* (2018.01)
*F21Y 115/10* (2016.01)
*F21W 107/10* (2018.01)
*B60Q 1/28* (2006.01)
*B60Q 1/30* (2006.01)
*B60Q 1/32* (2006.01)
*F21S 45/48* (2018.01)

(56) References Cited

U.S. PATENT DOCUMENTS

| | | | |
|---|---|---|---|
| 3,930,225 A * | 12/1975 | Mollico | B60Q 1/54 340/466 |
| 4,564,789 A * | 1/1986 | Kokubu | B60Q 3/80 307/10.8 |
| 5,130,903 A * | 7/1992 | Fast | B60Q 1/14 362/466 |
| 5,255,164 A * | 10/1993 | Eidelman | B60Q 1/2611 340/475 |
| 5,321,588 A * | 6/1994 | Weddemann | B60Q 1/302 362/543 |
| 6,411,204 B1 * | 6/2002 | Bloomfield | B60Q 1/302 340/464 |
| 7,275,839 B2 | 10/2007 | Coushaine et al. | |
| 7,445,359 B2 | 11/2008 | Chang | |
| 7,572,654 B2 | 8/2009 | Chang | |
| 7,674,111 B2 | 3/2010 | Chung et al. | |
| 7,687,288 B2 | 3/2010 | Saha et al. | |
| 7,982,332 B2 | 7/2011 | Nelson et al. | |
| 8,044,412 B2 * | 10/2011 | Murphy | H01L 23/60 257/81 |
| 8,878,228 B2 | 11/2014 | Lee | |
| 9,676,323 B2 * | 6/2017 | Datz | B60Q 1/2696 |
| 9,758,088 B1 * | 9/2017 | Salter | B60Q 1/0041 |
| 2003/0035300 A1 * | 2/2003 | Branstetter | B60Q 1/2638 362/549 |
| 2008/0092800 A1 | 4/2008 | Smith et al. | |
| 2013/0218410 A1 * | 8/2013 | Chen | B60Q 1/143 701/36 |
| 2014/0055989 A1 * | 2/2014 | Hochstein | F21V 29/70 362/218 |
| 2014/0126212 A1 * | 5/2014 | Lim | F21V 5/04 362/267 |
| 2015/0124466 A1 * | 5/2015 | Kushimoto | B60Q 1/085 362/466 |
| 2015/0138808 A1 * | 5/2015 | Salter | B60Q 1/26 362/510 |
| 2015/0153033 A1 * | 6/2015 | Kuo | F21K 9/00 362/311.02 |
| 2015/0168644 A1 * | 6/2015 | Meyers | G01D 11/28 362/511 |
| 2015/0307020 A1 * | 10/2015 | Salter | B60Q 1/2696 362/510 |
| 2017/0297480 A1 * | 10/2017 | Elwell | F21S 43/19 |

\* cited by examiner

VEHICLE LIGHT ASSEMBLY WITH HEAT SINK

FIELD OF THE INVENTION

The present invention generally relates to exterior light assemblies of a vehicle, and more particularly, to light assemblies configured as light strips and coupled to a vehicle body.

BACKGROUND OF THE INVENTION

Vehicle light assemblies in the form of exterior light strips can suffer from poor heat dissipation, and as a result, are troublesome to operate at high intensity. Accordingly, there is a need for a light assembly that is free of these setbacks. The present disclosure is intended to satisfy this need.

SUMMARY OF THE INVENTION

According to a first aspect of the present invention, a vehicle light assembly is provided and includes a light source, an optic configured to output light emitted by the light source, and a thermal conductive member enclosing the light source and the optic. The thermal conductive member is thermally coupled to a vehicle body via a thermal transfer adhesive.

Embodiments of the first aspect of the invention can include any one or a combination of the following features:
  the light source is disposed on a printed circuit board that is enclosed by the thermal conductive member;
  the thermal conductive member includes one or more inner sidewalls that surround the light source and extend at an angle relative to the printed circuit board;
  a gap between the one or more inner sidewalls widens vertically as the one or more sidewalls extend away from the printed circuit board;
  the one or more inner sidewalls are lined with a reflector configured to redirect light emitted by the light source;
  a sealing adhesive seals the thermal transfer adhesive between the thermal conductive member and the vehicle body;
  the thermal transfer adhesive is provided at a central rear portion of the thermal conductive member and the sealing adhesive is provided about a rear peripheral region of the thermal conductive member and encloses the thermal transfer adhesive;
  the light source is disposed on a printed circuit board and the optic is disposed in a barrel of the thermal conductive member that encloses the light source and extends from the printed circuit board;
  the vehicle light assembly is assembled by a multi-shot insert molding process including molding the thermal conductive member to the printed circuit board, molding a reflector to one or more inner sidewalls of the barrel, and molding the optic over the light source;
  a controller is configured to operate the light source at varying intensity based on a vehicle speed, wherein the controller operates the light source at a first intensity so long as the vehicle speed is equal to or greater than a predetermined threshold;
  if the vehicle speed falls below the predetermined threshold, the controller operates the light source such that the intensity of the light source ramps up and down periodically with increasing magnitude and frequency as the vehicle speed decreases to zero;
  the light source is operated at a second intensity when the vehicle speed reaches zero, the second intensity being a multiple of the first intensity; and
  the vehicle light assembly is configured as a light strip extending longitudinally across a roofline location of a vehicle.

According to a second aspect of the present invention, a vehicle light assembly is provided and includes a light source, a thermal conductive member having a barrel that encloses the light source, and an optic disposed in the barrel and configured to output light emitted by the light source. The thermal conductive member transfers heat produced by the light source to a vehicle body via a thermal transfer adhesive coupling the thermal conductive member to the vehicle body.

Embodiments of the second aspect of the invention can include any one or a combination of the following features:
  the light source is disposed on a printed circuit board and the barrel is defined by one or more sidewalls extending at an angle relative to the printed circuit board;
  a gap between the one or more inner sidewalls widens vertically as the one or more sidewalls extend away from the printed circuit board;
  the one or more inner sidewalls are lined with a reflector configured to redirect light emitted by the light source;
  a sealing adhesive seals the thermal transfer adhesive between the thermal conductive member and the vehicle body; and
  the thermal transfer adhesive is provided at a central rear portion of the thermal conductive member and the sealing adhesive is provided about a rear peripheral region of the thermal conductive member and encloses the thermal transfer adhesive.

According to a third aspect of the present invention, a vehicle light assembly is provided. A light source is disposed on a printed circuit board. A thermal conductive member is molded to the printed circuit board and has a barrel. A reflector is molded to one or more sidewalls of the barrel. An optic is disposed inside the channel and is molded over the light source. A thermal transfer adhesive couples a rear portion of the thermal conductive member to a vehicle body. The thermal conductive member transfers heat produced by the light source to the vehicle body via the thermal transfer adhesive.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
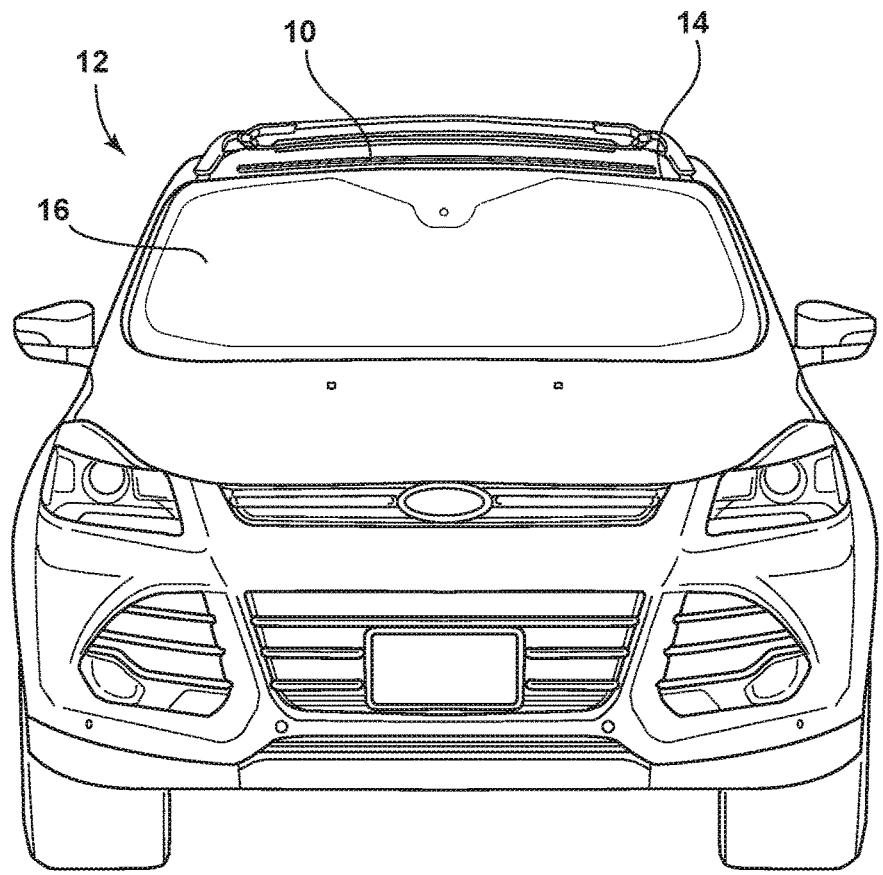
FIG. 1 is a front view of a vehicle and shows a light assembly provided at a front roofline location of the vehicle.
Figure 2:
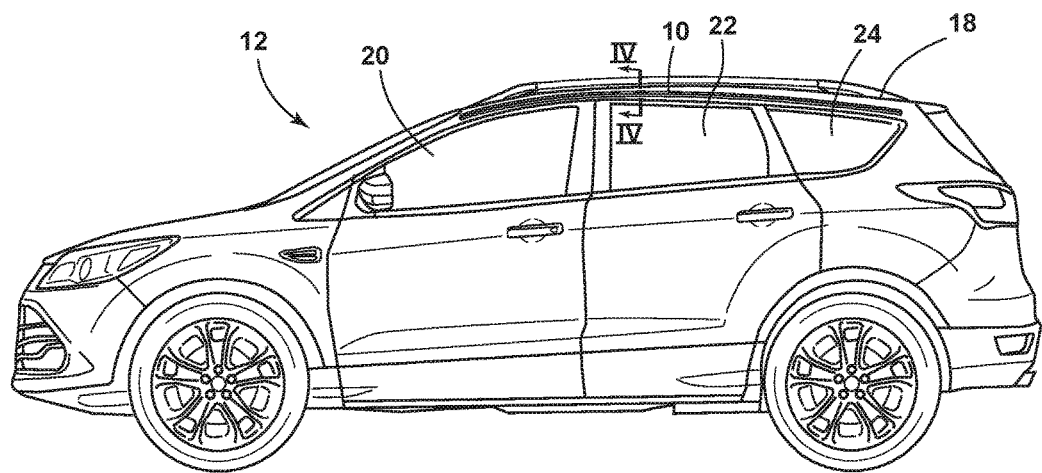
FIG. 2 is a side view of the vehicle and shows the light assembly provided at a side roofline location of the vehicle.
Figure 3:
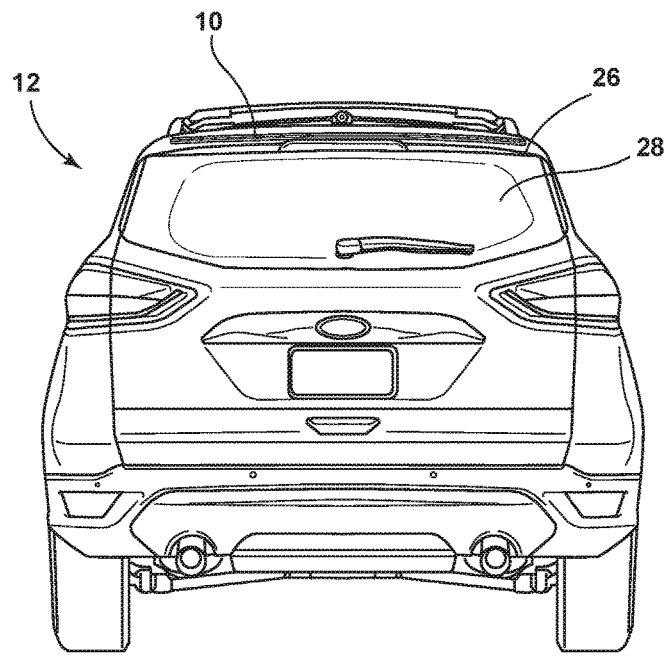
FIG. 3 is a rear view of the vehicle and shows the light assembly provided at a rear roofline location of the vehicle.

Referring to FIGS. 1-3, a light assembly 10 is shown coupled to several areas of a vehicle 12. The light assembly 10 produces visible illumination and is exemplarily configured as a light strip extending longitudinally across a number of roofline locations shown as a front roofline location 14 above a front windshield 16, a side roofline location 18 above side windows 20, 22, and 24, and a rear roofline location 26 above rear windshield 28. Roofline locations 14, 18, and 26 correspond to sheet metal portions of the vehicle body and function as heat sinks that dissipate heat produced by the light assembly 10. By leveraging the vehicle body to dissipate heat, the light assembly 10 may be operated at higher intensities. While the light assembly 10 is shown coupled to the roofline of the vehicle 12, it is to be understood that the light assembly 10 may be provided at other vehicle body locations that are composed of sheet metal.

Figure 4:
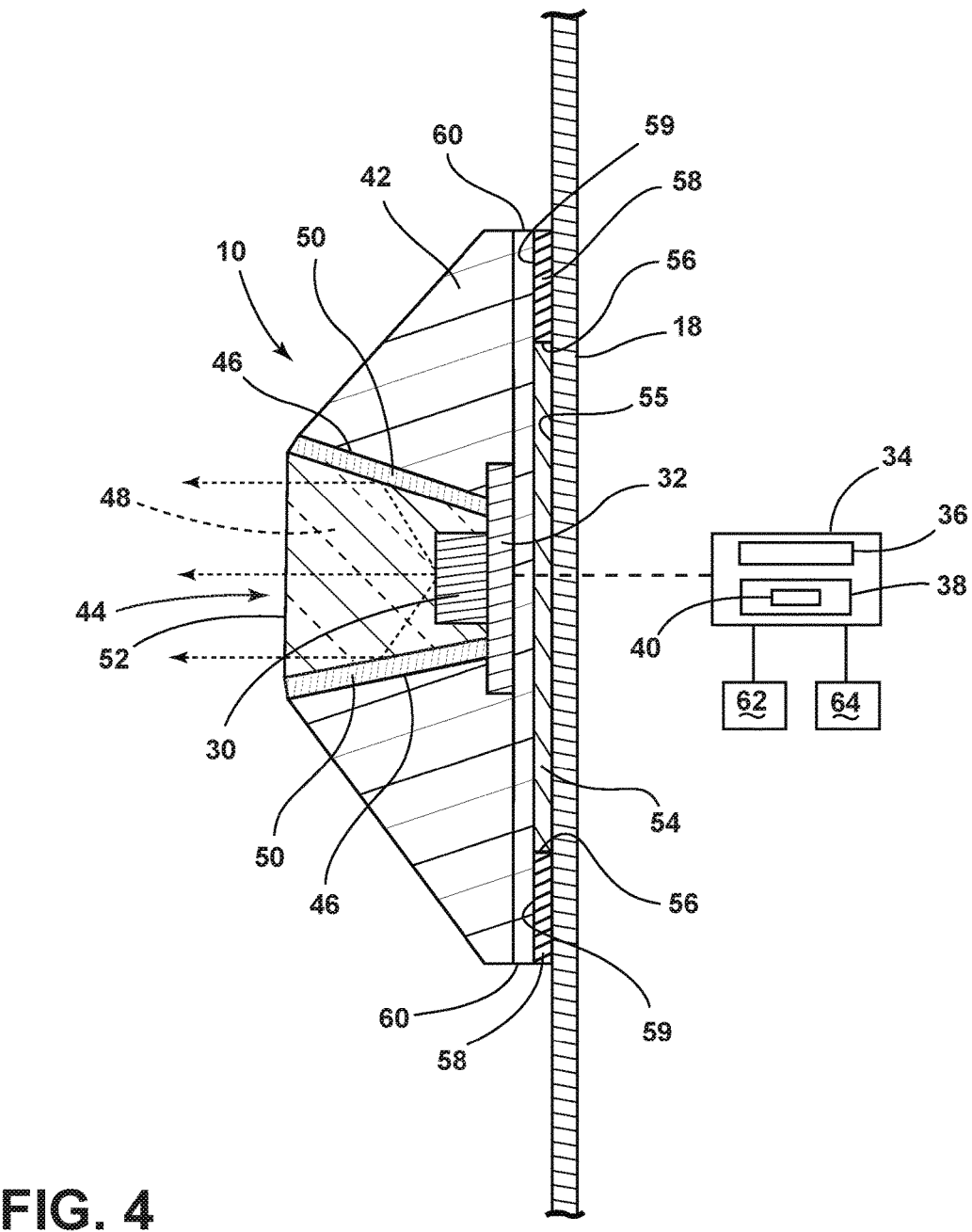
FIG. 4 is a cross-sectional view of the light assembly taken along line IV-IV of FIG. 2.

Referring to FIG. 4, the light assembly 10 includes a light source 30 disposed on a printed circuit board (PCB) 32. The PCB 32 may be configured to extend a length of the light assembly 10 and the light source 30 may include one or more light-emitting diodes (LEDs) spaced along the length of the PCB 32. The light source 30 may emit any desired color of visible light and is operated by a controller 34 electrically coupled thereto. The controller 34 may be provided on the PCB 32 or located elsewhere on the vehicle. For example, the controller 34 may correspond to a vehicle controller or be configured as a dedicated controller. The controller 34 includes a processor 36 and a memory 38 for storing instructions 40 executed by the processor 36 to implement control schemes related to the light assembly 10.

With continued reference to FIG. 4, a thermal conductive member 42 encloses the light source 30 and the PCB 32 and includes a barrel 44 defined by one or more inner sidewalls 46 that extend a length of the light assembly 10. The sidewalls 46 surround the light source 30 and extend at an angle relative to the PCB 32 such that a gap 48 between the sidewalls 46 widens vertically as the sidewalls 46 extend away from the PCB 32. The sidewalls 46 are lined with a reflector 50 configured to redirect light emitted by the light source 30. For purposes of illustration, light emitted by the light source 30 is generally represented in FIG. 4 by dashed arrows and is collected in an optic 52 configured to output light emitted by the light source 30 from the light assembly 10.

The optic 52 is disposed inside the barrel 44 and may be form-fitted therewith. In operation, the thermal conductive member 42 transfers heat produced by the light source 30 to the vehicle body (e.g., side roofline location 18) via a thermal transfer adhesive 54 coupling the thermal conductive member 42 to the side roofline location 18. The thermal transfer adhesive 54 is provided at a central rear portion 55 of the thermal conductive member 42 and is double-sided having edges 56 enclosed by a sealing adhesive 58. The sealing adhesive 58 seals the thermal transfer adhesive 54 between the thermal conductive member 42 and the vehicle body and assists with adhesion. The sealing adhesive 58 is provided about a rear peripheral portion 59 of the thermal conductive member 42 and is generally flush with one or more outer sidewalls 60 of the thermal conductive member 42.

The light assembly 10 may be assembled via a multi-shot insert molding process. For example, a first shot includes molding the thermal conductive member 42 to the PCB 32. A second shot includes molding the reflector 50 to the inner sidewalls 46 of the thermal conductive member 42. A third shot includes molding the optic 52 over the light source 30 inside the barrel 44 of the thermal conductive member 42. The thermal transfer adhesive 54 and the sealing adhesive 58 are then applied to the thermal conductive member 42 to allow the thermal conductive member 42 to be affixed to a desired location on the vehicle body. In such a configuration, the light assembly 10 may have a thickness of less than 5 mm and is resistant to impact imparted by bumps in the road, the closing of doors, environmental elements, etc.

According to one embodiment, the light source 30 includes one or more RGB LEDs and the PCB 32 has an FR4 grade designation. The thermal conductive member 42 may be formed using a thermoplastic elastomer that is modified to be conduct heat and provide electrical insulation. For example, the thermal conductive member 42 may be formed using a thermally conductive injection molding resin such as CoolPoly® D8102. The thermal conductive member 42 may be modified by adding conductive ceramics to boost heat dissipation. Additionally, the thermal conductive member 42 may be decorated with paint, in-mold film, or can be molded in a dark color for aesthetic purposes. The reflector 50 may be formed using a mold such as a UV-stable thermoplastic elastomer loaded with a titanium dioxide white pigment derived from rutile. The optic 52 may be formed using an impact and scratch resistant acrylic such as Plexiglas® V052i with an optional diffuser added thereto. The thermal transfer adhesive 54 may correspond to a thermal transfer tape and the sealing adhesive 58 may correspond to 3M 468MP tape. It will be understood that the foregoing components should not be construed as limiting and that skilled artisans will recognize other suitable components that are compatible with the light assembly 10 disclosed herein.

In operation, the controller 34 may operate the light source 30 at varying intensity depending on a vehicle speed and/or ambient light condition. For example, the controller 34 may communicate with one or more vehicle equipment such as a speed sensor 62 and a light sensor 64, and in response to input received therefrom, control the intensity of the light source 30. According to one embodiment, the controller 34 operates the light source 30 as a stop light. For example, the controller 34 may operate the light source 30 at a first intensity based on the vehicle speed being equal to or greater than a predetermined threshold. If the vehicle speed falls below the predetermined threshold, the controller 34 responds by increasing the intensity of the light source 30 to a second intensity that is reached by the time the vehicle 12 stops.

Figure 5:
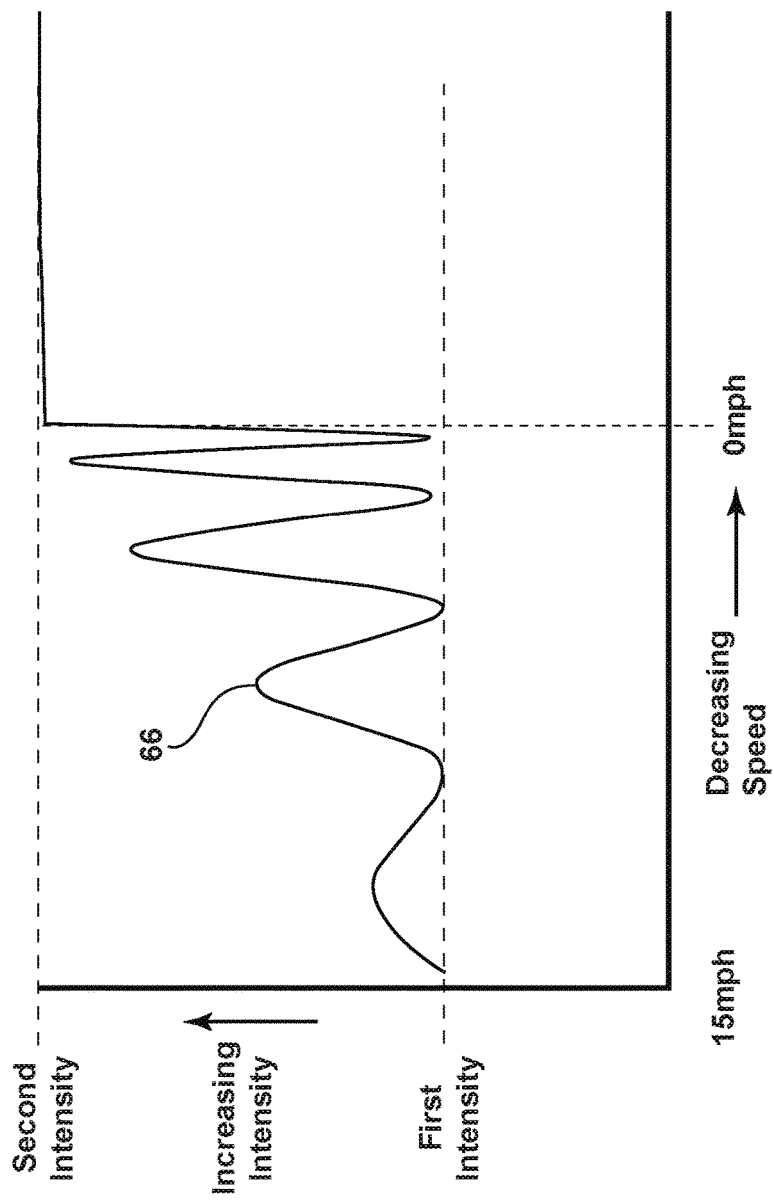
FIG. 5 illustrates an intensity curve of a light source of the light assembly.

Referring to FIG. 5, the controller 34 may operate the light source 30 at the first intensity so long as the vehicle 12 is traveling at a vehicle speed equal to or greater than a predetermined threshold exemplarily shown as 15 miles per hour. Once the vehicle speed falls below 15 miles per hour, the controller 34 operates the light source 30 according to intensity curve 66 such that the intensity of the light source 30 ramps up and down periodically with increasing magnitude and frequency as the vehicle speed decreases to zero. Once the vehicle speed is zero, or in other words, the vehicle 12 is stopped, the intensity of the light source 30 plateaus at the second intensity. In one embodiment, the second intensity is three times the first intensity. However, it is contemplated that the second intensity may be set to other multiples of the first intensity, if desired. It is also contemplated that the first and second intensities may vary based on ambient light conditions as measured by the light sensor 64. For example, the first and second intensities may be set to higher values to improve visibility during the day. In contrast, the first and second intensities may be set to lower values at night.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle light assembly comprising:
   a light source disposed on a printed circuit that is enclosed by a thermal conductive member;
   an optic configured to output light emitted by the light source;
   the thermal conductive member enclosing the light source and the optic and thermally coupled to a vehicle body via a thermal transfer adhesive, wherein the thermal conductive member comprises one or more inclined outer sidewalls and one or more inner sidewalls that surround the light source and extend at an angle relative to the printed circuit board, and wherein a gap between the one or more inner sidewalls widens vertically as the one or more sidewalls extend away from the printed circuit board; and
   a sealing adhesive that seals the thermal transfer adhesive between the thermal conductive member and the vehicle body, wherein the thermal transfer adhesive is provided at a central rear portion of the thermal conductive member and the sealing adhesive is provided about a rear peripheral region of the thermal conductive member and encloses the thermal transfer adhesive.

2. The vehicle light assembly of claim 1, wherein the light source is disposed on a printed circuit board and the optic is disposed in a barrel of the thermal conductive member that encloses the light source and extends from the printed circuit board.

3. The vehicle light assembly of claim 2, assembled by a multi-shot insert molding process comprising:
   molding the thermal conductive member to the printed circuit board;
   molding a reflector to one or more inner sidewalls of the barrel; and
   molding the optic over the light source.

4. The vehicle light assembly of claim 1, wherein the one or more inner sidewalls are lined with a reflector configured to redirect light emitted by the light source.

5. The vehicle light assembly of claim 1, configured as a light strip extending longitudinally across a roofline location of a vehicle.

6. A vehicle light assembly comprising:
   a light source disposed on a printed circuit board;
   a thermal conductive member having one or more inclined outer sidewalls and a barrel that encloses the light source;
   an optic disposed in the barrel and configured to output light emitted by the light source, wherein the thermal conductive member transfers heat produced by the light source to a vehicle body via a thermal transfer adhesive coupling the thermal conductive member to the vehicle body, and wherein the barrel is defined by one or more sidewalls extending at an angle relative to the printed circuit board; and
   a sealing adhesive that seals the thermal transfer adhesive between the thermal conductive member and the vehicle body, wherein the thermal transfer adhesive is provided at a central rear portion of the thermal conductive member and the sealing adhesive is provided about a rear peripheral region of the thermal conductive member and encloses the thermal transfer adhesive.

7. The vehicle light assembly of claim 6, wherein a gap between the one or more inner sidewalls widens vertically as the one or more sidewalls extend away from the printed circuit board.

8. The vehicle light assembly of claim 6, wherein the one or more inner sidewalls are lined with a reflector configured to redirect light emitted by the light source.

* * * * *